Nov. 12, 1935.  K. NAGAO  2,021,081

FILTERING APPARATUS

Filed Oct. 6, 1933

Inventor

Kinga Nagao

Patented Nov. 12, 1935

2,021,081

UNITED STATES PATENT OFFICE 2,021,081

FILTERING APPARATUS

Kinya Nagao, Fukazawamachi, Setagaya District, Tokyo, Japan

Application October 6, 1933, Serial No. 692,532

1 Claim. (Cl. 210—63)

The present invention relates to filtering apparatus in which fibers are accumulated to constitute the filtering layer automatically by liquid current as well as by centrifugal force at the beginning of filtering operation while the said filtering layer is disintegrated into individual fibers to be easily purified by a current of washing water when the filtering operation is concluded.

The filtering apparatus in accordance with the present invention comprises a conduit-pipe supplying fluid to be filtered and a filter-drum to be rotated around the said pipe, the said liquid supplying pipe possessing a great number of jets communicating with the interior of the drum and the latter containing a suitable quantity of asbestos fibers or the like. When the drum is rotated either by hand or mechanically and at the same time fluid to be filtered is passed into the conduit-pipe, the fluid from the jets agitates the asbestos fibers or the like and passes outwards through holes in the drum leaving the fibers on the interior side of the drum to constitute an evenly distributed filtering layer. Should the rotation of the drum stop, the filtering layer of fibers is kept at the same state by fluid current spouted from numerous jets of the conduit-pipe and clean filtrate purified by passing through the holes of the filtering layer of fibers flows out from the filter-drum, thus filtration is easily and perfectly accomplished. When the filtering operation is over, the action of liquid current ceases and the filtering layer disintegrates into individual fibers. Washing water is supplied through the same conduit-pipe to purify the fibers in the drum and the residue is washed away by a water stream which then flows out from the filter-drum. Thus the apparatus is now ready for the next filtering operation.

Figure 1:
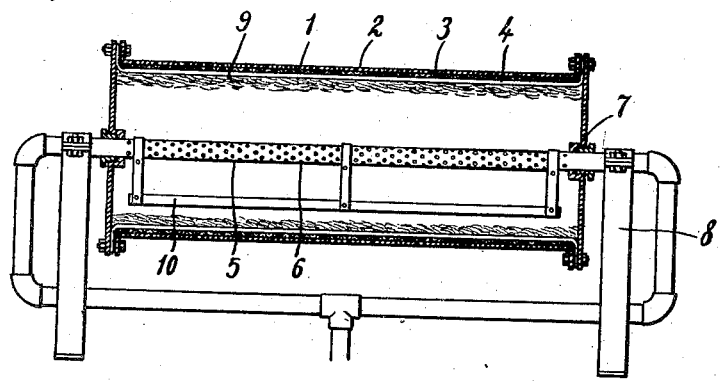
Figure 2:
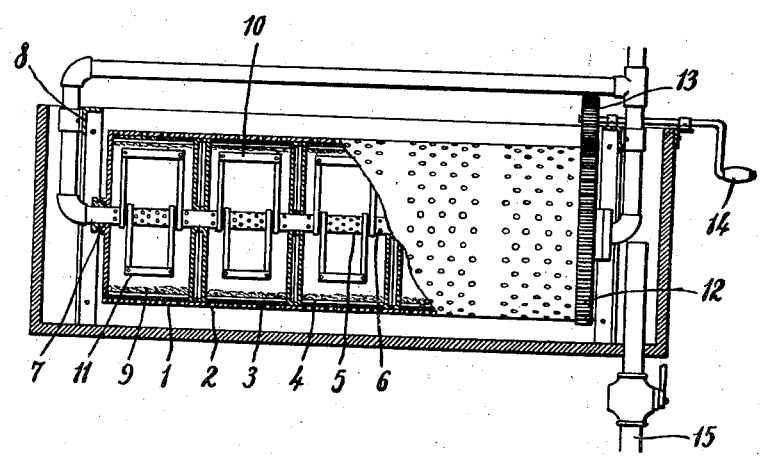

In the drawing Fig. 1 is a longitudinal sectional view of an embodiment of my invention under one form. Fig. 2 is a side elevation partly in section of a modified form of the apparatus embodying my invention.

Referring to Fig. 1, 1 indicates a filter-drum, 2 numerous holes perforated through the circumference of the said drum, 3 wire netting, 4 cloth woven with asbestos fibers, 5 conduit-pipe supplying liquid to be filtered into the drum and serving as shaft or axle upon which the drum is rotatably mounted, 6 a great many jets provided in the conduit-pipe in the interior of the drum, 7 packing, 8 shaft-bearing, 9 filtering layer of asbestos fibers accumulated on the interior circumference of the drum and 10 agitators fixedly mounted on the conduit pipe 5 and assisting the uniform accumulation of asbestos fibers.

Another embodiment is illustrated in Fig. 2 which is the side elevation, partially its longitudinal section. From 1 to 9 denotes the corresponding parts as in Fig. 1, and 10 indicates agitators fixed to the conduit-pipe, 11 agitators loosely mounted on the conduit-pipe and tending to oscillate under the impact of the water jets and the rotation of the drum, 12 is a gear-wheel attached to one end of the filter-drum, 13 is a gear-wheel engaged with the said gear-wheel 12, 14 is a rotating handle and 15 an outflow pipe. The filtering operation may be carried out in the same manner as explained in the foregoing embodiment, while in the case where fibers are to be washed, if the lower half of the drum is soaked in washing water and the drum is rotated, fibers tending to follow the interior surface of the rotating drum are checked by the fixed agitators 10 and caused to fall down and be washed promptly by the oscillating agitators 11.

Although various fibers such as, for example, artificial silk, natural silk, wool, cotton, hemp, ramie, glass wool or the like may be adapted as the filter-layer forming fibers in the present invention, asbestos fiber, which neither rots nor degrades, consequently never needs to be changed for new ones and moreover has strong adsorbing power, is one of the most preferable for filtration of various kinds of liquids.

While filtration by using hitherto known filtering apparatus is not only troublesome but also often difficult, automatic constitution of filtering layer of fibers and purification of the filtering layer constituting fibers in the apparatus in accordance with the present invention are both simple and easy. In consequence it is not only very convenient but also shows remarkable efficiency in filtering various kinds of liquids or solutions in factorys, households, swimming pools or the like.

I claim:—

A filtering apparatus comprising a horizontal liquid supply pipe, having jet openings and fixedly mounted on suitable supports, a series of agitators fixedly attached to said pipe and a series of agitators loosely mounted on said pipe and arranged and adapted to freely oscillate, a filtering drum having a perforated wall and rotatably mounted on said pipe said agitators being disposed within said drum and extending adjacent the perforated wall thereof, means for rotating said drum relatively to said pipe, a loosely situated layer of fibrous material within said drum and arranged and adapted to be spread upon the interior surface of the drum by centrifugal force and, by the action of the jets, projected through the jet openings of the supply pipe and to constitute a filtering medium for the liquid supplied to the interior of the drum.

KINYA NAGAO.